United States Patent [19]

Komiya

[11] Patent Number: 4,867,578
[45] Date of Patent: Sep. 19, 1989

[54] DUST-FREE ROLLING CONTACT BEARING ASSEMBLY

[75] Inventor: Yoshiyuki Komiya, Kawasaki, Japan

[73] Assignee: Nippon Thompson Co., Ltd., Japan

[21] Appl. No.: 237,246

[22] Filed: Aug. 26, 1988

[30] Foreign Application Priority Data

Aug. 28, 1987 [JP] Japan .......................... 62-130219[U]

[51] Int. Cl.[4] .............................................. F16C 29/08
[52] U.S. Cl. .......................................... 384/15; 384/49
[58] Field of Search ........................ 384/15, 49, 43, 45

[56] References Cited

U.S. PATENT DOCUMENTS 4,616,885 10/1986 Komiya ................................. 384/15
4,706,510 11/1987 Zimmer ............................ 384/15 X

FOREIGN PATENT DOCUMENTS 1072862 1/1960 Fed. Rep. of Germany ........ 384/15

Primary Examiner—Thomas R. Hannon
Attorney, Agent, or Firm—Skjerven, Morrill, MacPherson, Franklin & Friel

[57] ABSTRACT

A dust-free linear motion rolling contact bearing assembly includes a U-shaped bed of a length, a table and a plurality of rolling members interposed between the bed and the table to provide a rolling contact between the bed and the table. A take-up/supply roller is rotatably mounted at each end of the table and a shield palte has its base end fixedly attached to the take-up/supply roller and has its forward end fixedly attached to the corresponding end of the bed. Thus, as the table moves linearly relative to the bed, the shield plate is either supplied as unwound from the take-up/supply roller or taken up as wound around the take-up/supply roller to keep the opening of the bed covered by the shield plate. Thus, the interior space of the bearing assembly is kept shielded at all times without any scrubbing action between the shield plate and the bed.

7 Claims, 4 Drawing Sheets

DUST-FREE ROLLING CONTACT BEARING ASSEMBLY

BACKGROUND OF THE INVENTION

1. Field of the Invention

This invention generally relates to a rolling contact bearing assembly, and, in particular, to a linear motion rolling contact bearing assembly of an enclosed type to thereby prevent dust and foreign matter from entering into the interior of the bearing assembly.

2. Description of the Prior Art

A linear motion rolling contact bearing assembly is well known in the art and it generally includes a bed or rail which extends straight over a desired length, a table or slider and a plurality of rolling members interposed between the bed and the table to thereby provide a rolling contact therebetween, so that the table may move linearly along the bed. In such a linear motion rolling contact bearing assembly, the bed includes a bottom wall and a pair of side walls which extend upright from the opposite sides of the bottom wall to thereby define a U-shaped cross section. And, a straight guide groove is provided at the inner surface of each of the pair of side walls. On the other hand, the table has a pair of outer side surfaces each of which is provided with a guide groove opposite to the corresponding guide groove of the bed. And, the plurality of rolling members, typically balls, are received in the paired guide grooves to thereby provide a rolling contact between the bed and the table. As a result, the table may move linearly relative to the bed.

In such a linear motion rolling contact bearing assembly, it is critical to keep the guide grooves and the rolling members clean and free of any foreign matter, such as dust. Otherwise, the rolling contact performance deteriorates and a high resistance may be created, which is detrimental to the performance of the linear motion rolling contact bearing assembly. In order to cope with this problem, the present inventor previously proposed to provide a dust-free structure to a linear motion rolling contact bearing assembly as disclosed in the U.S. Pat. No. 4,616,885, issued to the present inventor and assigned to the assignee of this application, which is hereby incorporated by reference. Although the structure disclosed in the above-mentioned patent provides a dust-proof environment, since the shielding member moves relative to the bed, the shielding member scrubs against the bed to thereby produce fine metal powder or dust, which then could be introduced into the guide grooves to thereby deteriorate the rolling performance. Thus, there has been a need to develop a further improvement in the structure of a dust-free rolling contact bearing assembly. Thus, as the table moves linearly relative to the bed, the shielding plate is unwound from or wound around the roller to thereby keep the interior space of the bearing assembly closed at all times.

With this structure, since there is no relative motion between the shielding means and the bed, the shielding means will not be scrubbed against the bed so that the production of metal powder or foreign matter, such as dust, is minimized, and, thus, the desired performance of the bearing assembly can be well maintained.

It is therefore a primary object of the present invention to obviate the disadvantages of the prior art as described above and to provide an improved dust-free linear motion rolling contact bearing assembly.

Another object of the present invention is to provide an improved dust-free linear motion rolling contact bearing assembly capable of preventing foreign matter, such as dust and metal powder, from being introduced into the rolling contact surfaces as much as possible.

A further object of the present invention is to provide an improved dust-free linear motion rolling contact bearing assembly compact in size, high in performance and stable in operation.

SUMMARY OF THE INVENTION

In accordance with the present invention, there is provided a dust-free linear motion rolling contact bearing assembly which includes a bed having a generally U-shaped cross section and provided with a first guide means, a table located at least partly in the interior space defined by the bed and provided with a second guide means, a plurality of rolling members interposed between said first and second guide means for providing a rolling contact between said bed and said table, and an extendable shielding means provided at one end of said table and having one end fixedly attached to one end of said bed to thereby substantially close the interior space defined by the bed. In one embodiment, an end block is fixedly attached to each end of the U-shaped bed, so that the bed having an end block at each end defines a tub-shaped structure. In this case, the forward end of the extendable shielding means is fixedly attached to the end block, preferably at the top surface thereof. The shielding means preferably includes a roller around which a shielding plate may be wound and which is rotatably mounted at one end of the table. The base end of the shielding plate is fixedly attached to the roller. The roller is preferably spring-biased such that the roller is normally biased to rotate in a direction to take up the shielding plate therearound.

A still further object of the present invention is to provide an improved dust-free linear motion rolling contact bearing assembly capable of maintaining the stable operation for an extended period of time.

Other objects, advantages and novel features of the present invention will become apparent from the following detailed description of the invention when considered in conjunction with the accompanying drawings.

DESCRIPTION OF THE PREFERRED EMBODIMENTS

Figure 1:
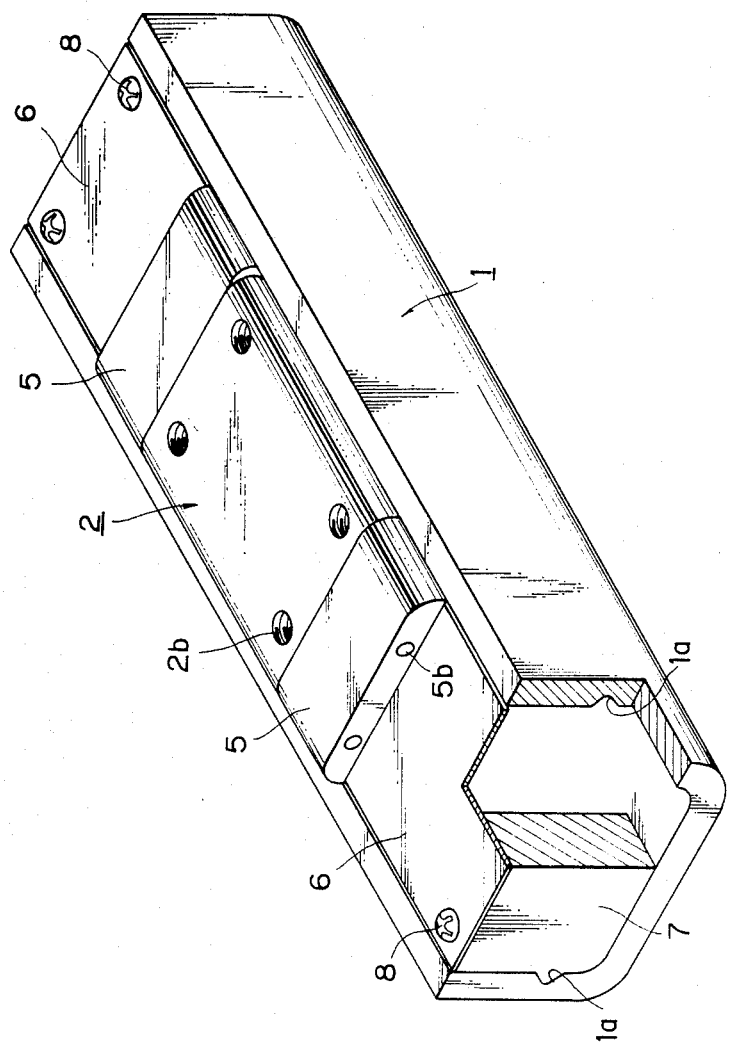
FIG. 1 is a partly broken-away, schematic illustration showing in perspective a dust-free linear motion rolling contact bearing assembly constructed in accordance with one embodiment of the present invention.
Figure 2:
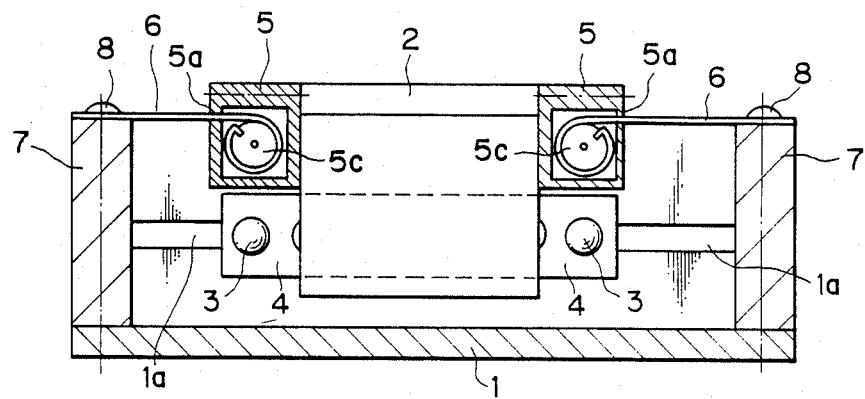
FIG. 2 is a schematic illustration showing in longitudinal cross section the dust-free linear motion rolling contact bearing assembly shown in FIG. 1.
Figure 3:
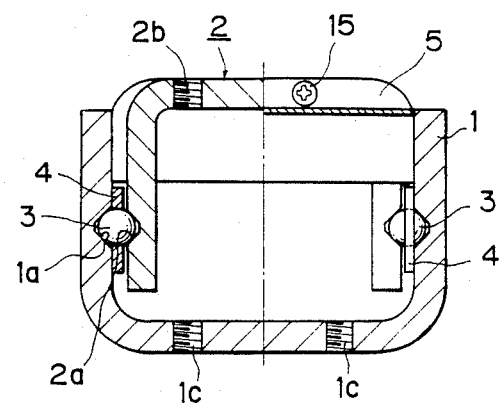
FIG. 3 is a schematic illustration showing partly in transverse cross section the dust-free linear motion rolling contact bearing assembly shown in FIG. 1.

Referring now to FIGS. 1 through 3, there is schematically shown a dust-free linear motion rolling contact bearing assembly constructed in accordance with one embodiment of the present invention. As shown, the illustrated bearing assembly includes a bed (rail) 1 which extends straight over a predetermined length and which is generally U-shaped in cross section. Thus, the bed 1 includes a flat bottom wall and a pair of side walls each of which extends upright from the corresponding side of the bottom wall to thereby define a U-shaped cross section. Preferably, the bed 1 is made of a metal, preferably thin metal, to provide a desired rigidity. In the illustrated embodiment, an end block 7 is fixedly attached at each end of the bed 1 so that the bed 1, together with a pair of end blocks 7, define a tub-like structure. An outer guide groove 1a is formed at the inner side surface of each of the pair of side walls as extending in a longitudinal direction.

A table (slider) 2 is disposed at least partly inside the interior space defined by the bed 1. In the illustrated embodiment, the table 2 is comprised of a flat top wall and a pair of side walls each depending vertically straight from the corresponding side of the flat top wall to thereby define a U-shaped cross section (or inverted U-shaped cross section to be exact). The table 2 may also be formed from a metal plate, preferably thin metal plate. The width or length between the opposite outer surfaces of the pair of side walls of the table 2 is set slightly smaller than the width or length between the opposite inner surfaces of the side walls of the bed 1, so that the table 2 may be located inside the interior space defined by the bed 1. A straight inner guide groove 2a is formed at the outer side surface of each of the pair of side walls of the table 2 and the inner guide groove 2a extends in parallel with and is located opposite to the corresponding outer guide groove 1a of the bed 1 when assembled. Thus, the paired inner and outer guide grooves 1a and 2a define a straight guide channel.

A plurality of rolling members 3, such as balls or rollers, are provided in the straight guide channel and thus partly received in the inner and outer guide grooves 1a and 2a to thereby provide a rolling contact between the bed 1 and the table 2. A retainer plate 4 is provided in a gap between the inner surface of the side wall of the bed 1 and the outer surface of the side wall of the table 2. The retainer plate 4 is elongated in shape and formed with a plurality of through-holes arranged at a predetermined pitch in the longitudinal direction. Each of the through-holes retains one of the rolling members 3 therein. Thus, the rolling members 3 are spaced apart one from another at a predetermined relationship determined by the retainer plate 4.

In the embodiment shown in FIGS. 1 through 3, a shielding unit is provided at each end of the table 2. The shielding unit includes a case 5 which is fixedly attached to one end of the table 2 and which contains therein a rotatably supported and spring-biased take-up/supply roller 5c around which a shielding plate 6 is wound. The shielding plates as best seen in FIGS. 1 and 2 are in the form of a pair of imperforate continuous linear bands each extending between their respective take-up/supply roller 5c and adjacent end block 7 of bed 1. The case 5 is formed with a slit 5a through which the shielding plate 6 extends outside of the case 5. The base end of the shielding plate 6 is fixedly attached to the take-up/supply roller 5c and the forward end thereof is fixedly attached to the top surface of the corresponding end block 7 by means of screws 8. Although not shown specifically, the take-up/supply roller 5c is spring-biased such that the roller 5c is normally spring-biased to take up the shielding plate 6 therearound. Thus, when the table 2 moves closer to one of the end blocks 7, the shielding plate 6 which has its forward end fixedly attached to the closer end block 7 becomes wound around the take-up/supply roller 5c automatically while the other shielding plate 6 is unwound from the other take-up/supply roller 5c. As a result, even if the table 2 moves along the longitudinal direction relative to the bed 1, the interior space of the bearing assembly is kept closed. More importantly, since the shielding plate 6 is stationary with respect to the bed 1, it is prevented from scrubbing against the bed 1, so that foreign matter, such as dust, is effectively prevented from being introduced into the interior space of the bearing assembly.

In the embodiment shown in FIGS. 1 through 3, the case 5 is fixedly attached at each end of the table 2 above the retainer plates 4. Thus, the width of the shield plate 6 may be set substantially equal to but slightly smaller than and not larger than the width of the bed 1. Thus, the gap between the side edge of the shield plate 6 and the side wall of the bed 1 can be minimized to effectively prevent dust from entering the interior space of the bearing assembly. In the illustrated embodiment, the end block 7 is fixedly attached at each end of the bed 1 and the forward end of the shield plate 6 is fixedly attached to the top surface of the end block 7. Alternatively, instead of providing such an end block 7, the forward end portion of the shield plate 6 may be bent in the shape of "L" and this L-shaped portion may be fixedly attached at the end of the bed 1 for closure thereof. In the illustrated embodiment, the end block 7 also serves as a stopper for limiting the travel of the table 2 relative to the bed 1. That is, the table 2 may move relative to the bed 1 until its one of the cases 5 comes into abutment against the corresponding end block 7. As best shown in FIG. 2, in the illustrated embodiment, since the retainer plate 4 is longer than the table 2, the load capacity of the table 2 is stable over its entire stroke so that the table 2 may move relative to the bed 1 substantially at the same load condition over its entire stroke.

The case 5 is generally box-shaped and its top wall is formed with mounting holes 5b, through which screws 15 are threaded into the top wall of the table 2 to have the case 5 fixedly attached to the table 2. The top wall of the table 2 is formed with several treaded mounting holes 2b, so that the table 2 may be fixedly attached to a desired object by threading bolts into these mounting holes 2b. The bottom wall of the bed 1 is also formed with several threaded mounting holes 1c, so that the bed 1 may also be fixedly attached to any desired object by having bolts screwed into these mounting holes 1c.

Figure 4:
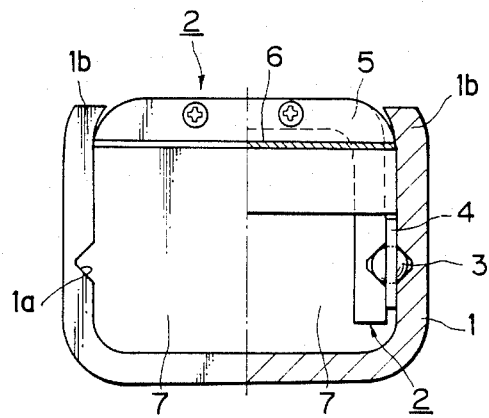
FIG. 4 is a schematic illustration showing partly in transverse cross section a dust-free linear motion rolling contact bearing assembly constructed in accordance with another embodiment of the present invention.

Referring now to FIG. 4, there is shown a dust-free linear motion rolling contact bearing assembly constructed in accordance with another embodiment of the present invention. As shown, the present embodiment is similar in many respects to the previous embodiment described with reference to FIGS. 1 through 3. Thus, like elements are indicated by like numerals. The present embodiment differs from the previous embodiment in that each of the side walls of the bed 1 has its top portion 1b curved inwardly as shown in FIG. 4. Thus, the gap between the shield plate 6 and each of the side walls of the bed 1 is minimized. Moreover, if the inwardly bent top portion 1b covers the gap between the shield plate 6 and the side wall, any debris or foreign matter falling under the influence of gravity is effectively prevented from being introduced into the interior space of the bearing assembly. Thus, the distance between the inner surfaces of the tip ends of the inwardly bent portions 1b is preferably set smaller than the width of the shield plate 6.

Figure 5:
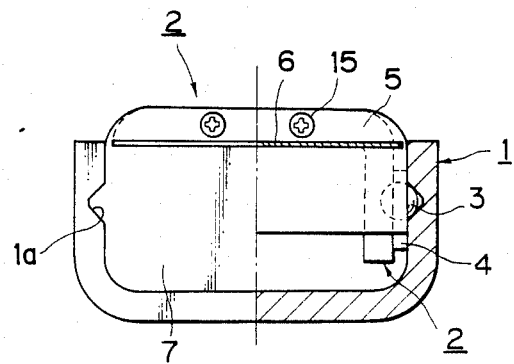
FIG. 5 is a schematic illustration showing partly in transverse cross section a dust-free linear motion rolling contact bearing assembly constructed in accordance with a further embodiment of the present invention.

Referring now to FIG. 5, there is schematically shown a dust-free linear motion rolling contact bearing assembly constructed in accordance with a further embodiment of the present invention. The present embodiment is also similar in many respects to the previous two embodiments excepting the fact that the retainer plate 4 is located substantially at the same height as the cases 5 of the front and rear shielding units. In this case, the length of the retainer plate 4 must be set shorter than the length of the table 2. Since the retainer plate 4 and the shielding unit cases 5 are disposed substantially at the same height, the overall height of the present bearing assembly can be made much smaller than the previous two embodiments. Thus, the structure of the present embodiment is particularly advantageous in making the dust-free bearing assembly compact in size. The travel of the table 2 is limited by an abutment between the end block 7 and the shielding unit case 5.

Figure 6:
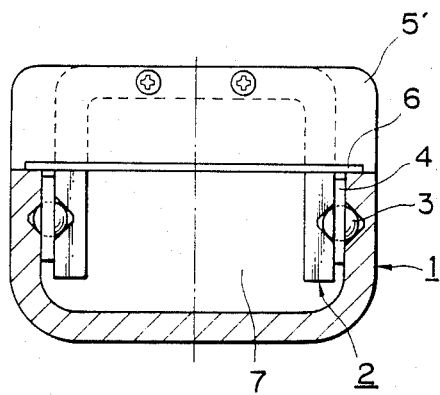
FIG. 6 is a schematic illustration showing partly in transverse cross section a dust-free linear motion rolling contact bearing assembly constructed in accordance with a still further embodiment of the present invention.
Figure 7:
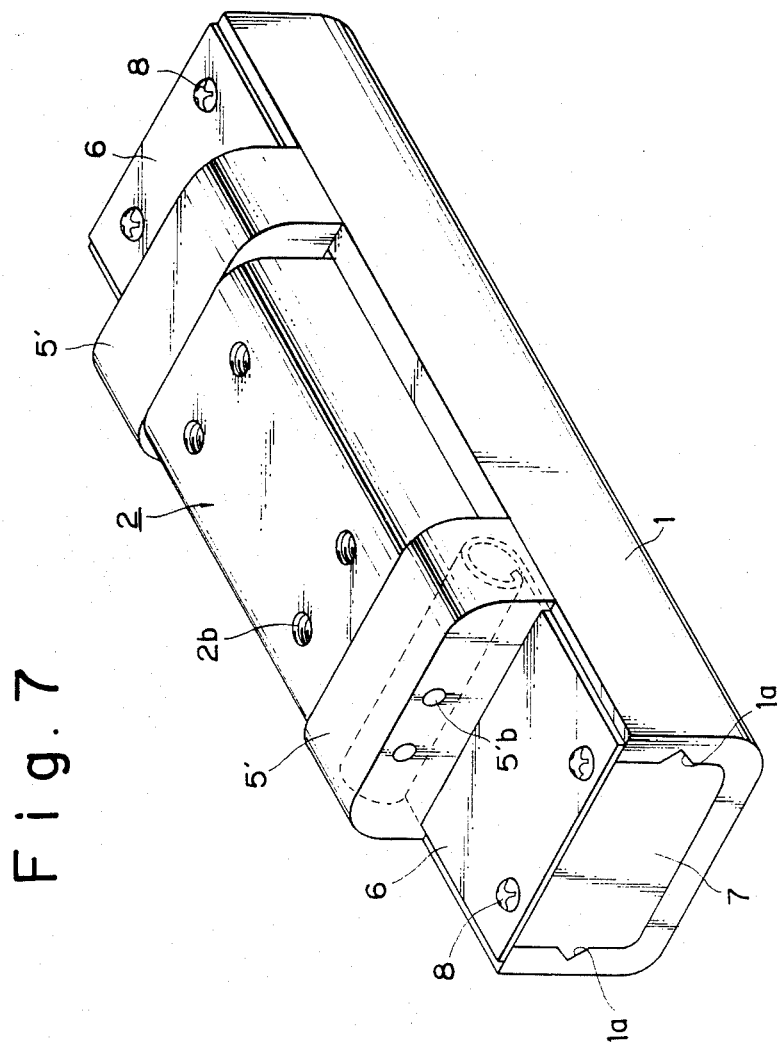
FIG. 7 is a schematic illustration showing in perspective the dust-free linear motion rolling contact bearing assembly shown in FIG. 6.

FIGS. 6 and 7 show a dust-free linear motion rolling contact bearing assembly constructed in accordance with a still further embodiment of the present invention. The present embodiment is also similar in many respects to the previously described embodiments; however, the present embodiment differs from the previous embodiments in the manner of arranging a roll of the shield plate 6. That is, the present embodiment also includes a bed (rail) 1 having a U-shaped cross section and provided with a pair of outer guide grooves 1a, a table (slider) 2 having an inverted U-shaped cross section and provided with a pair of inner guide grooves 2a each opposite to the corresponding one of the pair of outer guide grooves 1a, and a plurality of balls 3 interposed between the bed 1 and the table 2 as being received in the paired inner and outer guide grooves 1a and 2a. The present linear motion rolling contact bearing assembly also includes a pair of front and rear shielding units which shield the opening between the bed 1 and the table 2 so as to keep the interior space of the bearing assembly closed.

The shielding unit includes a case 5' for housing therein a roll of shield plate 6 which is wound around a take-up/supply roller (not shown). The shield plate 6 has its base end fixedly attached to the take-up/supply roller and its forward end fixedly attached to the top surface of the end block 7. As mentioned previously, as an alternative to the provision of the end block, the forward end portion of the shield plate 6 may be bent in the shape of "L" and this L-shaped portion may be fixedly attached to the end of the bed 1. Of importance, in the present embodiment, the shield plate case 5' is not disposed in the interior space defined by the bed 1, and, instead, it is disposed above the bed 1 and fixedly attached to a corresponding end of the table 2. Accordingly, in the present embodiment, the height of the bed 1 may be set lower than the previous embodiments, which is particularly advantageous in making the bearing assembly lighter in overall weight and more sturdy in structure. More importantly, in the present embodiment, since the shield plate 6 is located entirely above the interior space of the bed 1, the width of the shield plate 6 may be made larger in size than the width of the bed 1. This is particularly advantageous from the view point of dust-free characteristic because it can be insured that there is virtually no gap between the shield plate 6 and the bed 1 without any scrubbing action therebetween. In the illustrated embodiment, the shield plate 6 is shown to have a larger width than the distance between the inner surfaces of the side walls of the bed 1. Thus, the shield plate 6 may cover the opening of the bed 1 completely when pulled out of the case 5'.

The case 5' is formed with a pair of mounting holes 5b' through which screws may be threaded into the corresponding threaded holes formed in the top wall of the table to thereby have the case 5' fixedly attached to the table 2. The case 5' may have an open bottom and the shield plate 6 unwound from the roll inside the case 5' may be pulled out of the case 5' from its open bottom. As an alternative, the forward end of the shield plate 6 may be fixedly attached to any intermediate location of the bed 1 and it does not have to be limited to the end of the bed 1 as long as the remaining portion is covered by something else permanently. Furthermore, in the present embodiment, since the retainer plate 4 is located below the shielding unit cases 5', it may be set longer than the table 2 and as long as desired, so that increased stability in operation can also be attained. The case 5 or 5' may be made of any desired material, such as plastics and metals; however, it is preferable to make the case 5 or 5' from plastics because it is light in weight. The shield plate 6 may also be made of any desired material, including plastics and metals, but plastics are preferred because of its lightweightness.

While the above provides a full and complete disclosure of the preferred embodiments of the present invention, various modifications, alternate constructions and equivalents may be employed without departing from the true spirit and scope of the invention. For example, in the embodiments described above, use has been made of balls as rolling members 3; however, use may also be made of any other types of rolling members, such as rollers. In addition, the novel structure of the present invention can also be applied to any well-known endless type linear motion rolling contact bearing assembly including an endless circulation path for the rolling members. Moreover, the table 2 is smaller in width than the bed 1 in the embodiments described above; however, the present invention is also equally applicable to a linear motion rolling contact bearing assembly including a table whose width is larger than a bed, in which case the table straddles the bed. Therefore, the above description and illustration should not be construed as limiting the scope of the invention, which is defined by the appended claims.

What is claimed is:

1. A linear motion rolling contact bearing assembly, comprising:
   a bed having a bottom wall and a pair of side walls extending upwardly from said bottom wall to generally define a U-shaped cross section, said bed being provided with first guiding means;

a table provided with second guiding means locating opposite to said first guiding means when assembled;

a plurality of rolling members interposed between said bed and said table as being received in said first and second guiding means to thereby provide a rolling contact between said bed and said table; and shielding means for shielding an opening of said bed even as said table moves relative to said bed, said shielding means comprising a pair of imperforate continuous linear bands and including a pair of take-up/supply means one for each of said bands and fixedly attached to and at spaced ends of said table for taking up or supplying said bands, said bands having forward ends fixedly attached respectively to predetermined spaced locations on said bed.

2. The assembly of claim 1 wherein said take-up/supply means includes a pair of take-up supply rollers, a roll of each of said bands are wound around a respective one of said take-up/supply rollers and wherein said rollers are located in an interior space defined by said bed.

3. The assembly of claim 1 wherein said take-up/supply means includes a pair of take-up supply rollers, a roll of each of said bands are wound around a respective one of said take-up/supply rollers and wherein said rollers are located above said bed.

4. The assembly of claim 3 wherein said bands are larger in width than a distance between inner surfaces of said pair of side walls of said bed.

5. The assembly of claim 1 wherein said take-up/supply means includes a pair of take-up supply rollers, and further comprising a case fixedly attached to one end of said table to substantially enclose a roll of each of said bands wound around a respective one of said take-up/supply rollers.

6. The assembly of claim 5 wherein each of said take-up/supply rollers are rotatably supported by said case.

7. The assembly of claim 1 wherein said bed is provided with an end block at each end to provide a closure at the end thereof and respective ones of said forward ends of said bands are fixedly attached to a surface of a juxtaposed one of said end blocks.

* * * * *